UNITED STATES PATENT OFFICE.

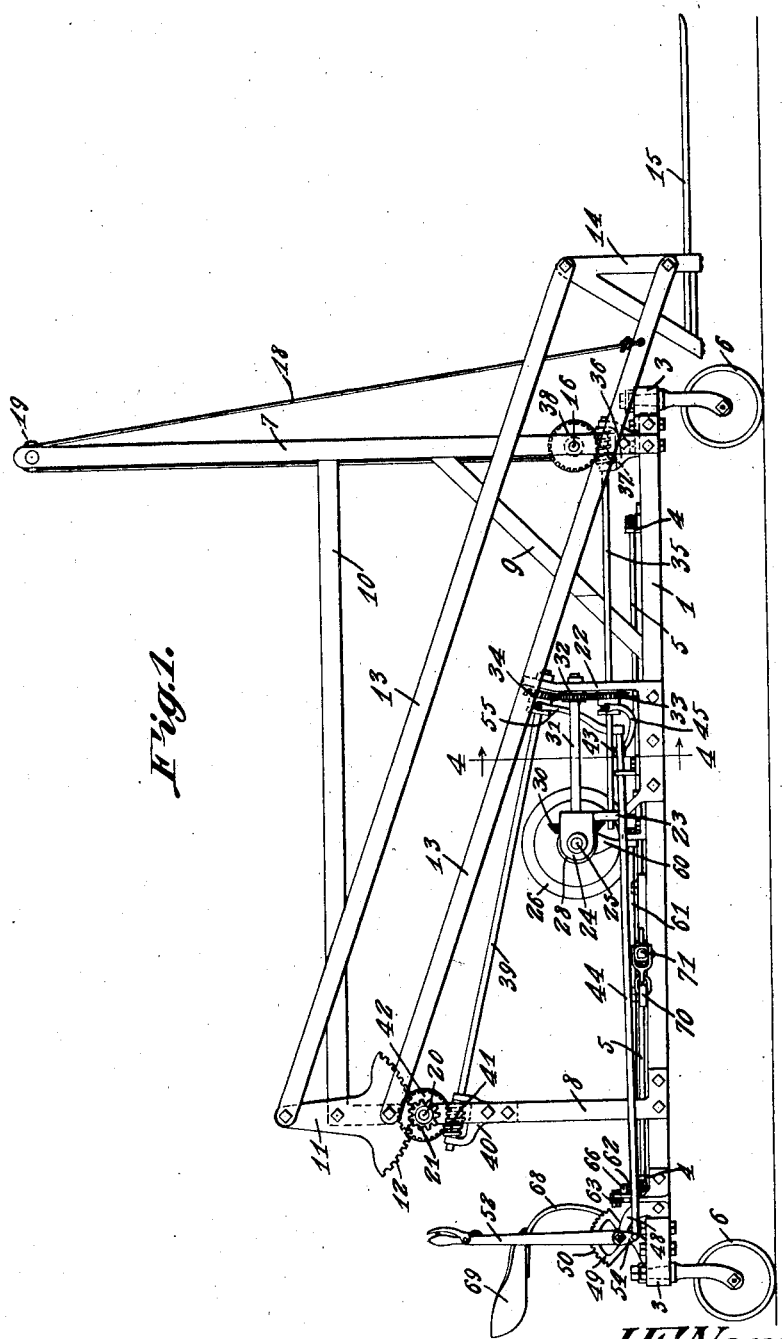

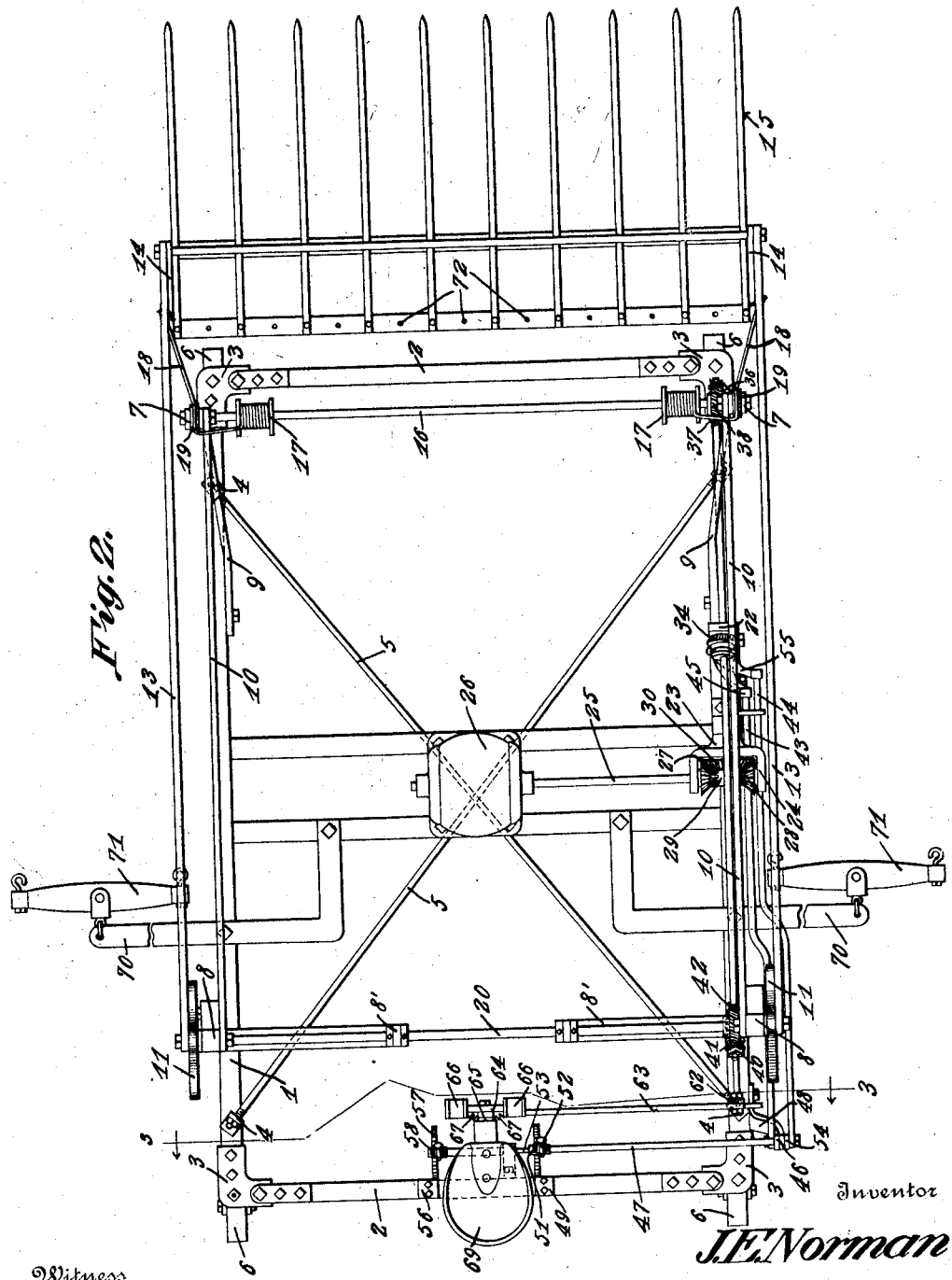

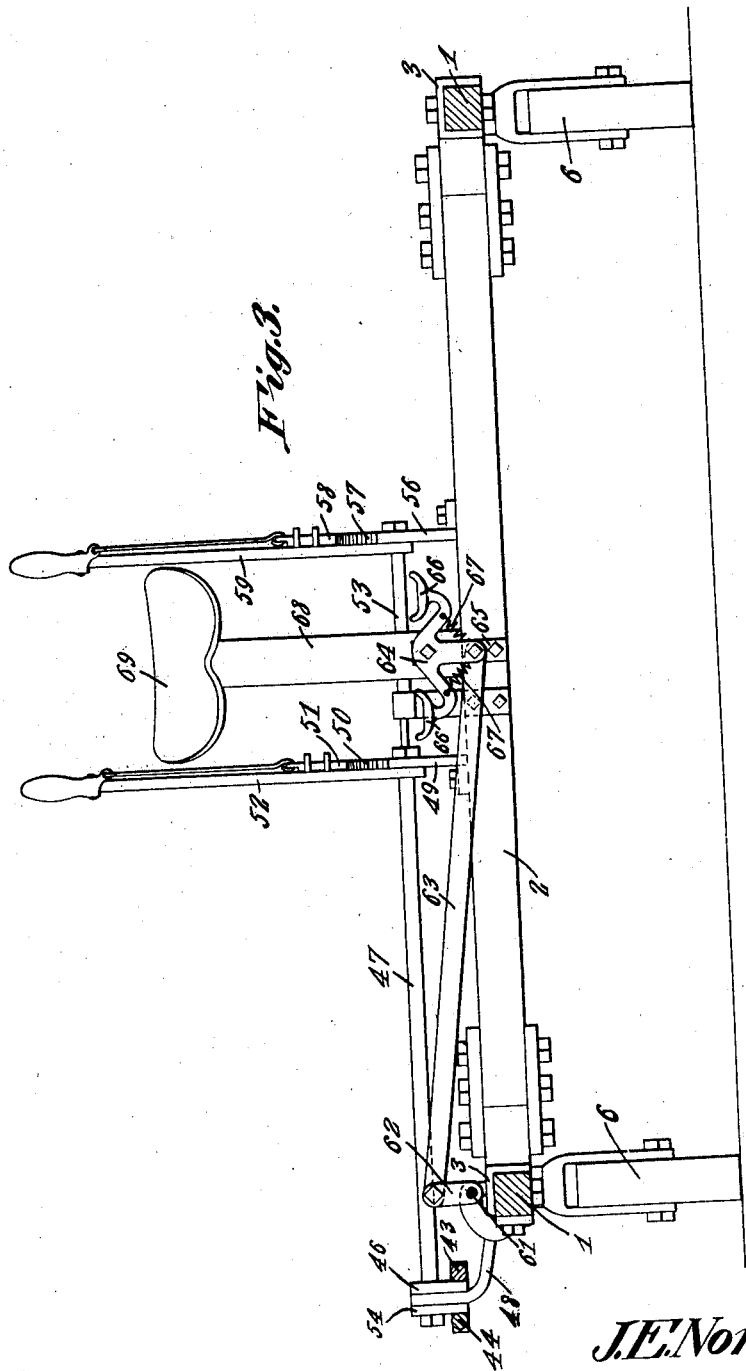

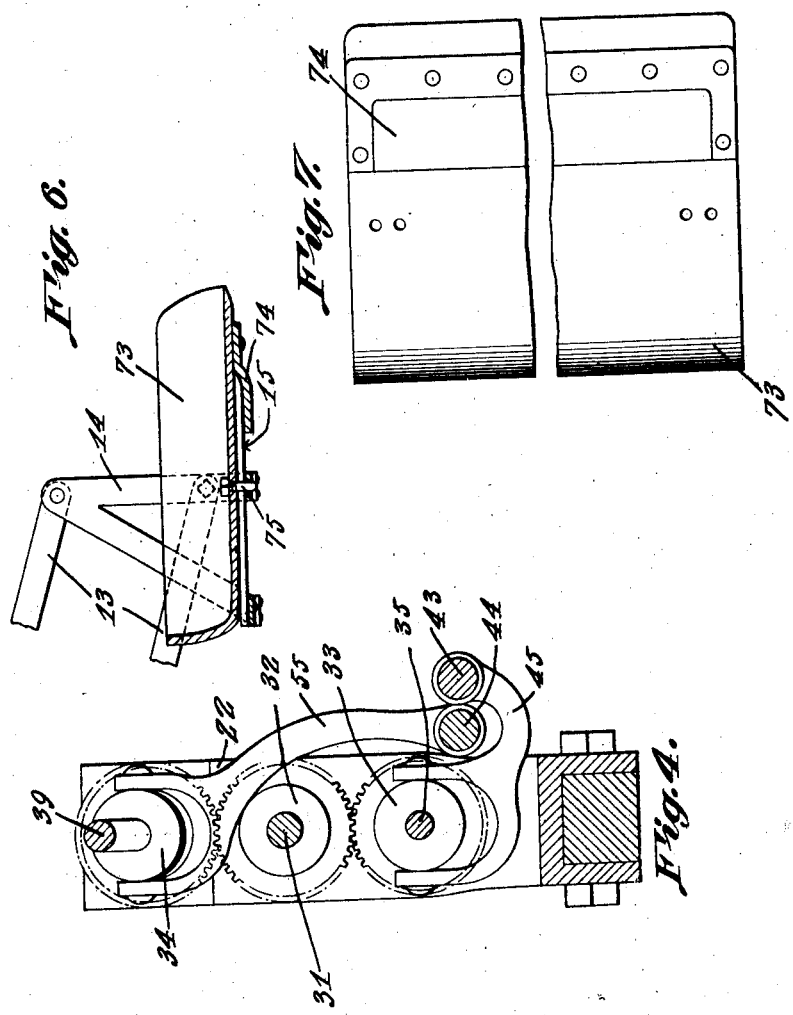

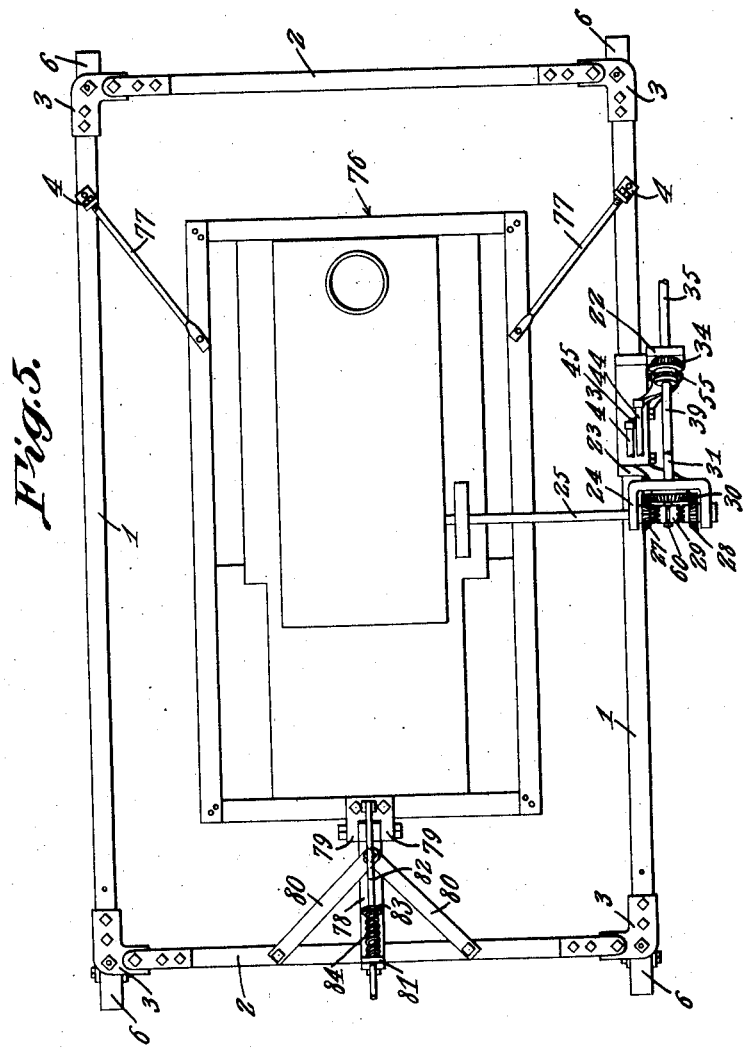

JAMES ERNEST NORMAN, OF LARNED, KANSAS.

HAYSTACKER AND WHEAT-HEAVER.

1,332,227.  Specification of Letters Patent.  Patented Mar. 2, 1920.

Application filed July 8, 1918. Serial No. 243,871.

*To all whom it may concern:*

Be it known that I, JAMES E. NORMAN, a citizen of the United States, residing at Larned, in the county of Pawnee and State of Kansas, have invented a new and useful Haystacker and Wheat-Heaver, of which the following is a specification.

The subject of this invention is a machine for handling hay and grain which may be used for loading or stacking hay or loading and moving grain or the like.

The main object of the invention is to provide a tractive structure which will elevate and dump material.

Another object is to provide elevating mechanism for the device.

Still another object is to provide means for dumping the material after it is elevated.

A further object is to provide means for controlling the elevating and dumping mechanism.

A still further object is to provide a simple durable and efficient hay and grain handling device.

With the foregoing and other objects in view which will appear as the description proceeds the invention resides in the combination and arrangement of parts and in the details of construction hereinafter described and claimed it being understood that changes in the precise embodiment of the invention herein disclosed can be made within the scope of what is claimed without departing from the spirit of the invention.

A practical embodiment of the invention is shown in the accompanying drawings wherein:—

Figure 1 is a side elevation of a machine constructed in accordance with the invention;

Fig. 2 is a plan view;

Fig. 3 is a transverse section on the line 3—3 of Fig. 2;

Fig. 4 is an enlarged detail sectional view taken on the line 4—4 of Fig. 1;

Fig. 5 is a plan view showing a tractor attached, parts being removed;

Fig. 6 is a detail sectional view of a scoop attachment;

Fig. 7 is a fragmentary bottom plan view of the same.

Referring to the drawings by numerals of reference:—

In carrying out the invention a frame is provided consisting of side bars 1 and front and rear cross pieces 2 which are joined to the side bars by the corner pieces 3. Brackets 4 are secured to and rise from the side bars and diagonally disposed brace rods 5 extend between these brackets and serve to strengthen the structure. Wheels 6 are pivotally secured to each corner piece 3 and serve to support the device for traction.

Rising from each side bar 1 near its forward end is an upright 7 the foot of which is secured to the side bar in any suitable manner. An upright 8 is secured to each side bar 1 near the rear end thereof. A diagonal brace 9 may extend between each upright and its side bar 1 for the purpose of properly bracing the upright, and a horizontal bar 10 extends between each upright 7 and the upper end of each upright 8. These uprights form supports for the main operative mechanism of the device.

Pivoted to the upper end of each upright 8 is a lever 11 the lower end of which is formed to provide a segmental gear 12.

Each lever 11 is fulcrumed near its central point and near its upper and lower ends are pivotally secured the rear ends of bars 13—13 the forward ends of which have pivotal connection with the upper and lower ends of side pieces 14 of the frame work of a rake 15. The levers 11 and side pieces 14 are vertically disposed and, therefore, parallel. The bars 13 which are pivotally connected to the levers 11 and side pieces 14 are also parallel.

Any motion of these parts will therefore be a parallel movement, and when the parts are moved to elevate the rake 15, the rake must remain in a horizontal position. That this elevation of the rake may be accomplished, a horizontal shaft 16 extends between the uprights 7 in which it is journaled and, preferably, near the lower ends of the uprights. Drums 17 are secured on this shaft and about these drums are wound cables 18 which pass upwardly over guide sheaves 19 secured at the upper ends of the uprights 7, from whence they pass downwardly to connect with the lower bars 13.

A horizontally disposed shaft 20 extends between the uprights 8, in which it is journaled, and there are affixed thereon pinions 21 which mesh with the segmental gears 12 of levers 11 and operate, when the shaft is revolved, to rock the levers upon their fulcrums. Brackets 8' may extend inwardly from the uprights 8 to aid in supporting this shaft.

Secured to one side bar 1 is a bracket which has a standard 22 rising from its forward end and a standard 23 rising from its rear end, which standard merges into a rearwardly extending yoke 24.

A horizontal shaft 25 extends through the yoke 24, in which it is journaled, and this shaft may be driven by any suitable means, such as the motor 26. Loose on the shaft 25, within the yoke 24 are opposed bevel gears 27 and 28 between which slides a double throw clutch 29 which is feathered on the shaft 25. The bevel gears 27 and 28 mesh with a bevel gear 30 which is rigid on a horizontal shaft 31 journaled in the standards 22 and 23.

Rigid on the shaft 31, adjacent the standard 22, is a gear wheel 32 which meshes with a lower gear wheel 33 and an upper gear wheel 34. The lower gear wheel 33 is feathered on a horizontal shaft 35 the rearward portion of which extends between and is journaled in the standards 22 and 23. The forward end of this shaft is journaled in a bracket 36 which is secured to and rises from the main frame, and upon this end is formed a worm 37 which meshes with a worm wheel 38, which wheel is rigid on the shaft 16.

As will be understood, when the gear 33 is in mesh with the gear 32 the shaft 35 will be revolved and will, through the worm gear, revolve the shaft 16 to wind or unwind the cablese and raise or lower the rake when the clutch 29 is in engagement with the bevel gear 28 or 27, respectively.

The gear wheel 34 is feathered on an inclined shaft 39 the lower forward end of which is journaled in the upper end of the standard 22 while the upper rear end is journaled in a bracket 40 which is secured to an upright 8. A worm screw 41 is provided on the rear end of the shaft 39 and this screw meshes with a worm wheel 42 which is rigid on the shaft 20.

When the gear wheels 32 and 34 are in mesh and the bevel gear 28 engaged by the clutch 29 the worm will revolve the shaft 20 to rock the levers 11 and dump the rake 15, while with the clutch in engagement with the gear 27 the rake will be returned to normal position.

For the purpose of sliding the gears 33 and 34 on their respective shafts, rods 43 and 44 are provided which extend along one side of the machine and are supported in suitable brackets. The rod 43, terminates in a fork 45 which engages the annular groove in the hub of the gear wheel 33 in the usual manner.

The rod 43 terminates near the rear end of the machine and this end is pivotally engaged by the outer end of a crank 46 which is secured on a rock bar 47 which extends transversely of the machine and which is journaled in a bracket 48 secured to one of the side bars of the machine and a bracket 49 which is secured to and rises from the rear cross piece 2 near the center of said cross piece. The bracket 49 is formed with a segmental rack 50 which is adapted to be engaged by a latch 51 carried by the hand lever 52. The hand lever 52 is rigid on the rod 47 and is operated to rock the same to reciprocate the rod 43 and throw the gear 33 in and out of mesh.

The rod 47 is preferably hollow and through it extends a rod 53 which is free to turn in the rod 47. A crank 54 is rigid on the outer end of the rod 53 and its outer end has pivotal engagement with the rear end of the rod 44. The forward end of the rod 44 is angled, as shown, and terminates in a fork 55 which engages the annular groove of the hub of the gear wheel 34 in the usual manner. The rod 53 is supported by a bracket 56 which is secured to and rises from the rear cross piece 2. The bracket 56 is formed with a segmental rack 57 which is engaged by a latch 58 carried by the hand lever 59. Hand lever 59 is rigid on the rod 53 and is operated to rock the rod to reciprocate the rod 44 and throw the gear wheel 34 in and out of mesh.

As will be readily understood, throwing the gear wheels 33 and 34 in mesh operates the rack elevating or dumping mechanism respectively.

The double throw clutch 29 is operatively engaged by a crank 60 carried by the forward end of a rock shaft 61 which extends longitudinally at one side of the frame and is supported by suitable brackets which rise from the frame. A crank 62 is rigid on the shaft 61, near its rear end and the outer end of this crank has pivotal engagement with one end of a link 63 the other end of which is pivoted to the depending arm 64 of a T-shaped bell crank lever.

The T-shaped lever is pivoted to a support 65 which is secured to the rear cross piece 2. The ends of the cross arms of the T-shaped lever are formed to provide treadles 66 upon which the operator's feet may rest and which may be alternately depressed to rock the shaft 61 and throw the clutch to engage the bevel gear 27 or 28 as the case may be. Retractile springs 67 may extend between each cross arm of the T-shaped lever and the support 65 for the purpose of maintaining the parts in normal position and the clutch 29 out of contact.

A standard 68 may be secured to the rear cross piece 2 and upon the upper end of this standard a seat 69 may be secured.

Horizontal arms 70 are secured to and extend to each side of the frame and to the outer end of each arm is secured a single-tree 71, or other draft device, to which horses may be hitched to furnish tractive power for the device.

The rake 15 is formed so that the spacing of the tines and the tines themselves may be changed, as indicated by the extra apertures 72, so that the rake may be capable of handling fine material when desired.

A scoop 73 may also be provided and formed with a transverse pocket 74 on its under face. This scoop may be mounted on the rake with the ends of the tines projecting into the pocket 74 and so protected against injury. The scoop may be secured to the rake by set screws 75 or in any other suitable manner. This scoop is of great advantage in handling fine material and grain which could not be held by a rake or fork.

It might be desirable to use a tractor for transporting the device from place to place. When such is the case the diagonal and cross braces are removed as is also the motor.

An ordinary tractor, indicated at 76, Fig. 5, is placed within the frame and the forward portion secured to the frame by tie rods 77 which are secured to the tractor and extend therefrom to the brackets 4 to which they are also secured.

The rear end of the tractor is secured to the device by an arm 78 which extends forwardly from the rear cross piece 2 to which it is secured and the forward end of which is pivotally engaged between ears 79 which extend from the rear of the tractor frame.

Brace rods 80 may extend between the arm 78 and the rear cross piece 2 for the purpose of supporting the arm. An upright 81 rises from the rear cross piece 2 and the upper end thereof is provided with an aperture through which extends the rear end of a rod 82, the forward end of which is secured to the tractor frame. A collar 83 surrounds this rod and a cushioning spring 84 is confined between this collar and the upright 81.

The device may be propelled along the ground with the rake or scoop lowered to pick up material; this material may then be carried to any desired point, the rake or scoop elevated to the desired position and the material then dumped.

This device may be used for a great variety of work such as bucking hay or straw, pitching hay, stacking hay; loading grain; and in fact, loading or pitching any material which can be handled by a rake, fork or scoop.

Having thus described the invention, what is claimed as new and sought by Letters Patent, is:

1. A device of the class described, comprising a frame, uprights secured to the forward end thereof, a pair of inclined members pivotally connected to said frame and adapted to operate in parallelism, means for operating said members, a rake pivotally secured to the ends of said members, means carried by said uprights for raising and lowering said parallel members and thereby the rake, said rake being normally maintained in horizontal position, and means pivoted to one end of each of said inclined members and adapted to cause movement of the same to throw said rake out of horizontal position.

2. A device of the class described, comprising a frame, uprights secured to the forward end thereof, a pair of inclined members pivotally connected to said frame and adapted to operate in parallelism, means for operating said members, a rake pivotally secured to the ends of said members, means carried by said uprights for raising and lowering said parallel members and thereby the rake, means for converting the rake into a scoop, the organization being such that the rake and thereby the scoop is normally maintained in horizontal position, and means pivoted to one end of each of said parallel members and adapted to cause movement of the same to throw said rake and thereby the scoop out of horizontal position.

3. The combination with a device constructed as set forth in claim 1, of means for transporting the same.

In testimony that I claim the foregoing as my own, I have hereto affixed my signature in the presence of two witnesses.

JAMES ERNEST NORMAN.

Witnesses:
F. R. SNYDER,
NOBLE FULTON.